(12) United States Patent
Girotto et al.

(10) Patent No.: US 10,543,389 B2
(45) Date of Patent: Jan. 28, 2020

(54) MACHINE FOR PHYSICAL EXERCISE

(71) Applicant: GIROTTO BREVETTI SRL, Spresiano (IT)

(72) Inventors: Adriano Girotto, Spresiano (IT); Stefano Cesa, Spresiano (IT)

(73) Assignee: GIROTTO BREVETTI SRL, Spresiano (IT)

( * ) Notice: Subject to any disclaimer, the term of this patent is extended or adjusted under 35 U.S.C. 154(b) by 281 days.

(21) Appl. No.: 15/543,770

(22) PCT Filed: Jan. 10, 2016

(86) PCT No.: PCT/IB2016/050096
§ 371 (c)(1),
(2) Date: Dec. 4, 2017

(87) PCT Pub. No.: WO2016/116826
PCT Pub. Date: Jul. 28, 2016

(65) Prior Publication Data
US 2018/0021619 A1 Jan. 25, 2018

(30) Foreign Application Priority Data

Jan. 19, 2015 (IT) .............................. TV2015A0008
Sep. 17, 2015 (IT) ........................ 102015000052403

(51) Int. Cl.
*A63B 21/00* (2006.01)
*H02K 49/10* (2006.01)
*A63B 23/035* (2006.01)

(52) U.S. Cl.
CPC .. *A63B 21/00192* (2013.01); *A63B 21/00069* (2013.01); *A63B 21/4043* (2015.10);
(Continued)

(58) Field of Classification Search
CPC .......... A63B 21/00192; A63B 21/4043; A63B 21/00069; A63B 23/03566;
(Continued)

(56) References Cited

U.S. PATENT DOCUMENTS 5,014,981 A * 5/1991 Prelich ............. A63B 21/00192
482/106
6,234,938 B1 5/2001 Chen
(Continued)

OTHER PUBLICATIONS

International Search Report & Written Opinion dated Apr. 26, 2016 from corresponding International PCT Application No. PCT/IB2016/050096.

*Primary Examiner* — Sundhara M Ganesan
(74) *Attorney, Agent, or Firm* — Innovation Capital Law Group, LLP; Vic Lin

(57) ABSTRACT

An improved machine (MC) for physical exercise is described. To simplify the structure it comprises an object (14) displaceable by a user through muscular effort and connected to a device (M1, M8) for generating a resistance force, wherein the device comprises a magnet (36; 92) and a piece (38; 90) responsive to the magnetic field of the magnet which have facing surfaces (U1, U2, U3, U4), each of which extend respectively along two parallel axes, and are mounted to slide relatively along one of said parallel axes overlapping progressively and, through mutual magnetic interaction, to develop a mutual attractive repulsive force (Fm).

19 Claims, 11 Drawing Sheets

(52) U.S. Cl.
CPC ....... *A63B 23/03566* (2013.01); *H02K 49/10* (2013.01); *A63B 2209/08* (2013.01); *A63B 2220/56* (2013.01)

(58) Field of Classification Search
CPC .. A63B 2220/56; A63B 2209/08; H02K 7/00; H02K 7/1869; H02K 49/10
See application file for complete search history.

(56) References Cited

U.S. PATENT DOCUMENTS

| | | |
|---|---|---|
| 6,599,223 B2 | 7/2003 | Wang et al. |
| 6,857,993 B2 | 2/2005 | Yeh |
| 8,360,935 B2 | 1/2013 | Olsen et al. |
| 2002/0094912 A1 | 7/2002 | Tong |
| 2005/0037903 A1 | 2/2005 | Krietzman |
| 2005/0176560 A1 | 8/2005 | Chen |
| 2010/0062909 A1* | 3/2010 | Hamilton ........... A63B 24/0087 482/61 |
| 2010/0173748 A1* | 7/2010 | Teo ................ A63B 21/00192 482/5 |
| 2011/0306467 A1* | 12/2011 | Massa ............... A63B 21/005 482/5 |
| 2012/0135842 A1* | 5/2012 | Verkaik ............. A63B 21/068 482/5 |
| 2015/0190678 A1* | 7/2015 | Golsby .............. A63B 21/002 482/4 |

* cited by examiner

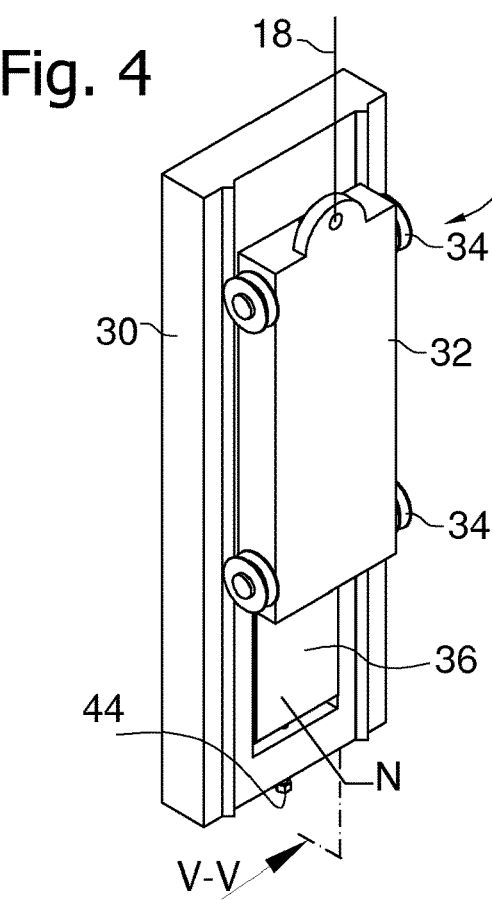
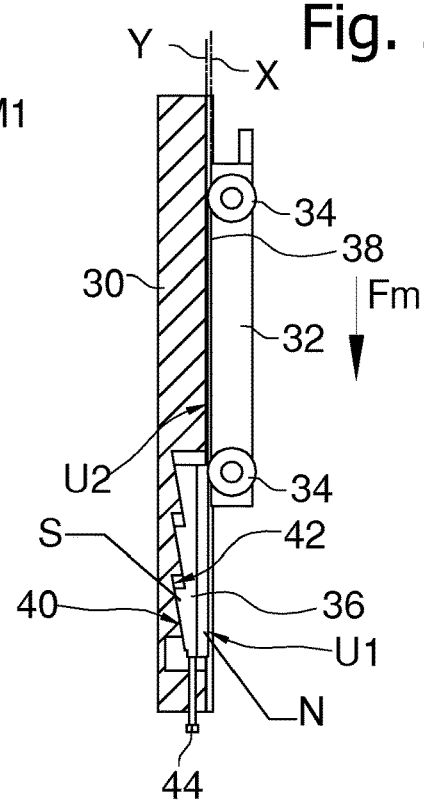
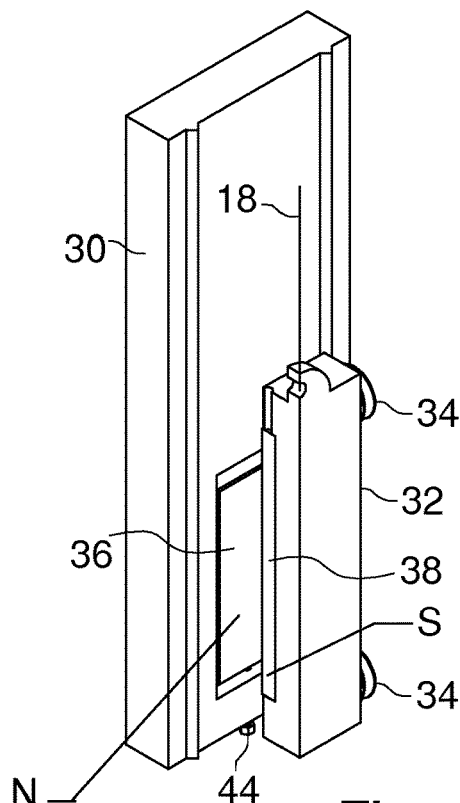
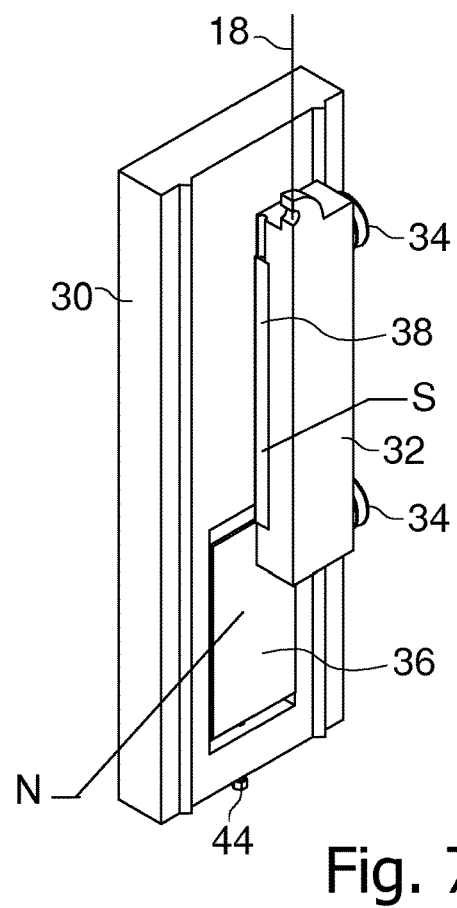

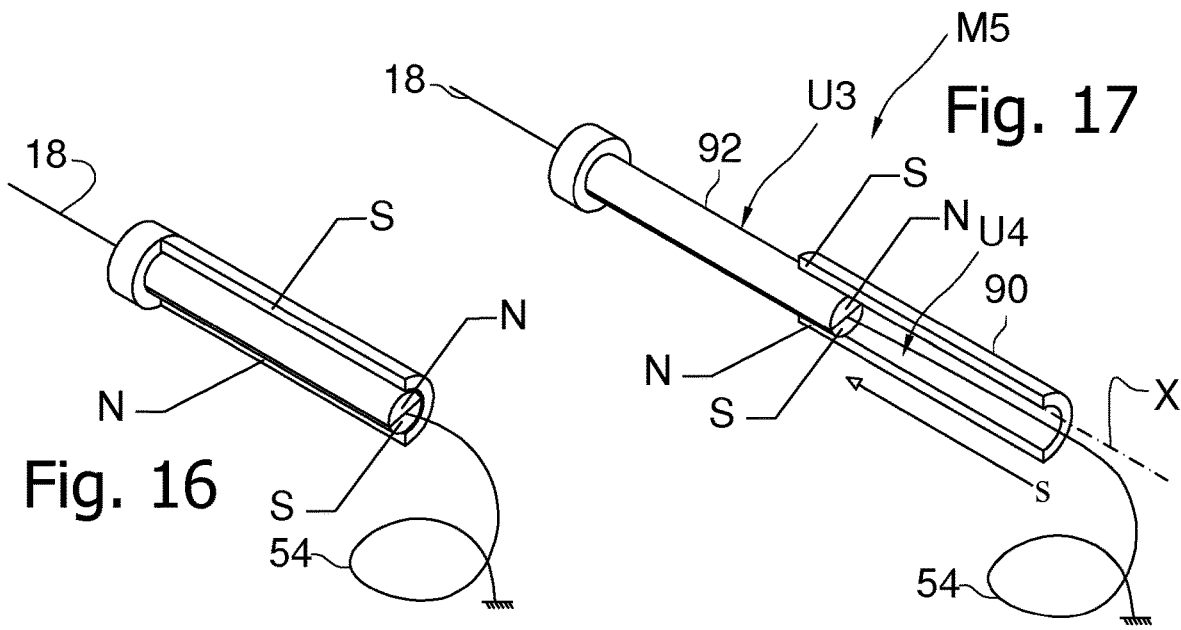
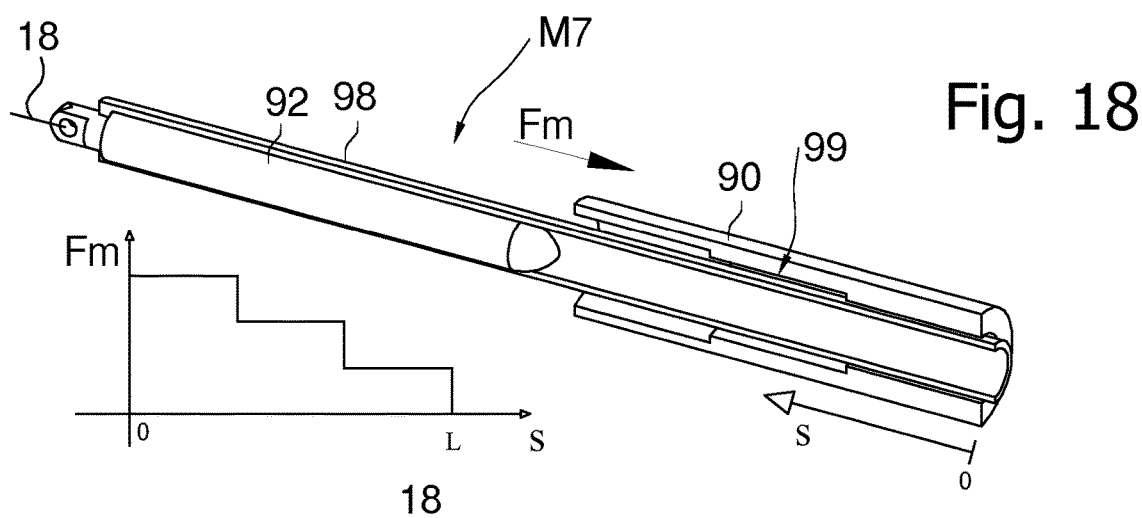

MACHINE FOR PHYSICAL EXERCISE

The invention refers—generally—to a machine for physical exercise equipped with a device for generating a force, e.g. a resistance force.

Fitness machines, see e.g. U.S. Pat. No. 8,360,935, exhibit to the user a resistance force to be overcome muscularly which is generated by gravity through weights (see FIG. 1), springs or by electrical motors. The weights and springs are expensive and cumbersome, though, and the motors also require sophisticated electronic controls. U.S. Pat. Nos. 6,857,993 and 6,599,223 use metallic flywheels interacting with a permanent magnet to generate the resistance force. It is basically a magnetic clutch which exploits the generation of, and interaction with, eddy currents in the flywheel. Clearly flywheels not only limit the machines to exercises that require rotating parts with a lot of turns, but they are bulky, heavy and for safety reasons must have an auxiliary brake. And magnetic clutches generate a resistance force only when the flywheel is rotating.

In general a device is missing for a machine for physical exercise, which not only exploits advantageously the magnetic properties of materials to generate a force, e.g. a resistance force to be applied to a load, but which is also simple to build, compact, reliable, versatile in the generated resistance force, and easily to be integrated in machines of different types.

In general, also a machine is missing for physical exercise which is simple to build, compact, reliable and versatile in the generated resistance force.

Then it is desired to obviate to one or more of these problems, with a machine like in the appended claims, wherein the dependent ones define advantageous variants.

In particular, a machine for physical exercise is presented comprising:

an object displaceable by a user through muscular effort and connected to a device for generating a resistance force, wherein the device comprises a magnet and a piece (e.g. made of or composed of ferromagnetic material, or another magnet) responsive to the magnetic field of the magnet which (i) have facing surfaces each of which extend respectively along two parallel axes (i.e. each of the surfaces extends along an axis, such axes being parallel to each other), and (ii) are mounted to slide relatively along one of said parallel axes overlapping progressively and, through mutual magnetic interaction, to develop a mutual attractive or repulsive force, wherein the polar axes of the magnet and/or of the piece are oriented orthogonally to said parallel axes.

The said piece responsive to the magnetic field may be e.g. a piece or element made of ferromagnetic material or a magnetic field source, such as e.g. a magnet or an electromagnet.

By the relative movement between the magnet and the piece the polar axes (or the polar axis if there is only one magnetic field source) move closer or away to each other while remaining substantially parallel to each other. Furthermore, the polar axes (or the polar axis if there is only one magnetic field source) remain substantially orthogonal to the direction of relative movement. This allows the resistance force to have constant or approximately constant value, and not the classic trend inversely proportional to the distance between the interacting magnetic poles.

It should be noted that the invention does not exploit the principle of the magnetic brake, i.e. the development of eddy currents inside a conductor when a magnetic field acts on said conductor. In that case, the magnetic properties of the conductor play no role in the phenomenon but only the electrical conductivity does, which instead has a decisive role on the braking action.

To understand the physical working principle of the invention, refer now to FIGS. 32-33. We premise the basic principles:

the different magnetic permeability of different materials or the ability, for certain of them such as mild steels, to convey in themselves more magnetic flux is exploited. Each system tends to arrange itself always in the condition of minimum energy, i.e. one that guarantees the channeling of all the magnetic flux in the ferromagnetic materials;

the ferromagnetic material crossed by the magnetic field does not come out of the magnetic field (generated by a magnetic field source), otherwise the braking force decreases;

a complete overlap does not occur between the ferromagnetic material and the magnetic field source, or the condition does not occur that one of the parts (magnetic or ferromagnetic) is more extended than the other and in complete overlap with the smaller part. This because the constant driving force that shows up is given by the different conditions of magnetic flux channeling;

the magnetically-generated force remains constant throughout the stroke of the device, as long as the not-total overlap between two relatively-sliding elements is guaranteed, preferably a magnet and a ferromagnetic guide which surrounds it, for example, a C- or comb-shaped guide;

the magnitude of the generated resistance force increases with increasing interpenetration between the magnet and the ferromagnetic guide.

In FIGS. 32 and 33, as an example the phenomenon of magnetic attraction exerted by an NdFeB-based cylindrical permanent magnet MG, with diametral magnetization, against a high-permeability mild-steel hollow cylinder CL can be analyzed.

Depending on their mutual position we give a rough estimate of the components of the magnetic flux B along the y directions (By), i.e. parallel to the magnetization direction of the magnetic cylinder, and along z (Bz), i.e. parallel to the direction of the magnet-cylinder symmetry axes and therefore along the direction of translational motion.

When the magnet MG is located at a sufficiently great distance from the cylinder CL (FIG. 32) and such that the flux lines are not intercepted by the ferromagnetic material, the outer section of the cylindrical magnet has uniform By. The Bz component is instead not null because of the discontinuity in the permeability of the medium: we are in the outer section of the magnet where on one side there is the air and on the other there is the cylindrical magnet with a permeability much higher than air. In this situation, the field lines deviate from the xy plane orthogonal to the z axis. The outer section of the cylinder has instead By=0 and Bz=0, since it is mild steel not subject to the static magnetic field.

When the magnet MG is in the vicinity of the cylinder CL (FIG. 33), the outer section of the cylinder exhibits By and Bz components that are different from zero, because of the higher permeability of steel with respect to air, which causes a confluence, in its interior, of the flux lines coming from the magnet. It is precisely the Bz component that is linked to the attraction force manifesting by the interpenetration of the two objects.

When the magnet MG is inserted almost completely into the cylinder, the component Bz, not zero, is present always and only in the sections of steel in correspondence of the discontinuities, i.e. in the sections of material that intersect the planes Sa and Sb (FIG. 33). In the described variants that follow e.g. in FIG. 25, 20 or 27, the cylinder CL is replaced by a C-shaped ferromagnetic element, but the operation is the same.

By varying the arrangement of the magnetic poles the attractive or repulsive nature of the force can be determined.

It is understood that the configuration defined above is very compact, inexpensive, easily resizable to generate a high resistance force and adaptable to virtually any type of exercise machine.

In particular, the magnet may be permanent, to simplify the structure, or may be an electromagnet and require a power supply.

The magnet and the piece may be movable between a position in which the surfaces are overlapping or close for maximally interacting magnetically and for developing a mutual attractive or repulsive force, and a position in which the surfaces are distant and the force is negligible (e.g. equal to or less than $1/10$ or $1/20$ of the maximum).

The distance of the surfaces is here meant e.g. as the distance between their centers; and the overlapping of the surfaces is understood here e.g. as the area of the orthogonal projection of one on the other.

E.g. the magnet and the piece may be relatively slidable through the rotation of at least one of the two about an axis, e.g. perpendicular to said parallel axes, and/or through linear translation.

In the first case one can generate a resistance torque, in the second a vector resistance force. For the linear translation one of the magnet or the piece may be mounted on a carriage, e.g. with wheels sliding on a guide integral with the frame of the machine, while the other is fixed, e.g. on the guide.

Preferably, said rotation entails an angle comprised between 0° and 180°, values which in practice correspond to useful machines.

Preferably, said translation has a stroke of 30 cm to 140 cm, in particular about 60 or 100 cm.

In either case, the magnet or the piece may comprise two portions or a (e.g. cylindrical or generally tubular) shell delimiting a cavity inside which the other is movable through translation. If the magnet is to be divided into the two said portions or occurs to have a shell-shape, an air gap is created for the piece, thereby maximizing the magnetic efficiency of the system. If instead it is the piece to form the cavity, the bipolarity of the magnet on two opposite sides thereof can be exploited to generate the resistance force.

Preferably in all the variants the linear translation occurs with reciprocating motion to make the exercise repeatable.

The facing surfaces may be flat or curved, e.g. complementary to each other, to enclose all or possibly the most magnetic flux of the magnet and thus maximize the resistance force; or the surfaces may be enclosed coaxially one inside the other. In general, moreover, the facing surfaces may be shaped so that along said parallel axes their profile, namely the distance measured orthogonally to said parallel axes, has a curved course or variable distance from said parallel axes. In particular, the profile may be concave, convex or stepped or comprise the series of two or more concavities and/or convexities. The advantageous effect is being able to easily modulate the resistance force with programmable or repeatable trend.

To vary the resistance force, the machine may optionally comprise a positioning mechanism or device for varying the distance, measured perpendicularly to said parallel axes, between the magnet and the piece (or the distance between said parallel axes). The positioning mechanism may envisage that the magnet and/or the piece have a portion being serrated or provided with inclined planes in sliding contact with another complementary surface, serrated or provided with complementary inclined planes, belonging to a third element, e.g. a support element. The planes or the serrations are inclined with respect to said parallel axes. Thus the relative linear motion between {the magnet and/or the piece} and the third element along a direction parallel to said parallel axes involves slippage of the planes or the serrated surfaces, and thereby the variation of the relative position of the facing surfaces, because compared to the third element the magnet and/or the piece also moves orthogonally to said parallel axes.

Note also that the third element may be the, or part of, said carriage, or a part of the guide on which it slides.

An advantageous configuration comes if the magnet has elongated or rod-like shape and the piece has the shape of a complementary tubular shell, or vice versa. Thus, the magnetic flux does not disperse much and can be exploited for the resistance force. In this variant the third element may be an element placed between the magnet and the piece, e.g. made of diamagnetic material. In particular, the third element may be tubular in shape and be disposed in the cavity of said tubular shell, and have a cavity in which the rod is slidable. In this variant the third element also may not have the positioning device or means mentioned above.

Another aspect of the invention is a method for generating resistance force in a machine for physical exercise, wherein the force is applied to an object displaceable by a user via muscular effort, wherein the force is derived from the mutual magnetic interaction between a magnet and a piece (e.g. made or composed of ferromagnetic material, or another magnet), responsive to the magnetic field of the magnet, which have facing surfaces which extend respectively along two parallel axes (i.e. each of the surfaces extends along an axis, such axes being parallel to each other), and are mounted for sliding relatively along one said axis overlapping progressively;

wherein the polar axes of the magnet and/or of the piece are oriented orthogonally to said parallel axes.

The variants described above for the machine are likewise usable in the method. In particular:

the magnet and the piece are arranged to move between a position in which the surfaces are superimposed or close to interact magnetically at most and to develop a mutual attractive or repulsive force, and a position in which the surfaces are distant and the force is negligible (e.g. equal to or less than $1/10$ or $1/20$ of the maximum);

the magnet and the piece are arranged to relatively slide by the rotation of at least one of two around an axis, e.g. orthogonal to said parallel axes, or by linear translation, advantageously and preferably with a reciprocating motion;

the magnet or the piece are arranged to slide, preferably with alternating motion, into two portions or a (e.g. cylindrical or generally tubular) shell which delimit a cavity of the other;

the resistance force is varied through the shaping of at least one of the facing surfaces so that along said parallel axes the profile of the surface, that is the distance measured orthogonally to said parallel axes, has a curved trend or variable distance from said parallel axes;

the resistance force is varied or made adjustable by means of adjustment of the distance, between the magnet and the piece, measured orthogonally to said parallel axes (or the distance between said parallel axes).

A preferred embodiment of the invention relates to a machine for physical exercise on which a force generating device or mechanism as defined below is installed.

The force generated by the device can be a resistance one, that is it opposes an external force, or driving, that is exerted to a member to move it.

The device or mechanism provides for a particular configuration, in which preferably said magnet and said piece are respectively comprised. The configuration comprises:

a first structure comprising elements which are arranged comb-like and comprise magnetic material, a second structure comprising elements which are arranged comb-like and comprise material (e.g. made or composed of ferromagnetic material, or another magnet) responsive to the magnetic field of said magnetic material, wherein (i) the elements of one structure and those of the other structure are arranged in interdigitated disposition, (ii) the two structures are relatively movable along a sliding direction, and (iii) the elements comprising magnetic material comprise a polar axis that is transverse (preferably substantially orthogonal) to the sliding direction and is facing elements comprising material responsive to the magnetic field of the second structure.

For comb-like or comb arrangement of the elements it is meant that they are (i) arranged in an array, (ii) separated from each other by a certain distance in order to delimit empty (preferably parallel to each other) channels, and (iii) preferably oriented along a common direction, e.g. they all lie on parallel planes.

For interdigitated disposition of the elements it is meant that the elements of one structure occupy the channels delimited by elements of the other structure.

The elements of the two structures by moving relatively can gradually overlap or recede from each other and, through mutual magnetic interaction, can develop an attractive or repulsive resistance force, or a force having programmable magnitude. In particular, thanks to the magnetic interaction between the elements of a structure that penetrate the void spaces between the opposite elements of the other structure, a resistance force can develop. This force will be higher the greater the interpenetration between the elements of the two structures.

The interdigitated structure of the elements allows generating a resistance force in a simple manner, with a compact and reliable system. By varying the arrangement of the magnetic poles on the elements one can determine the nature of the attractive or repulsive force (see below).

One or each of the two structures may be movable relatively to the other, and the movable structure is advantageously connectable (i) to an object movable by a user through muscular effort, so as to transfer to the user the resistance generated magnetically by the device, or (ii) to an organ of a generic machine, including those for producing tires, for pulling or pushing such an organ.

It is understood that the configuration of the elements defined above is not only very compact, but has the advantage of being easily sizeable to generate a high resistance force (it is enough to vary the number or the area of the elements that interact magnetically) and adaptable to virtually any type of machine, especially for fitness.

The two structures may be relatively movable along one or more Cartesian axes.

Preferably the two structures are relatively movable along an axis parallel to the direction (development) of the channels formed by the elements of a structure so as to exploit the magnetic interaction between the elements. It is the peculiar orientation of the polar axis of the magnetic parts with respect to those responsive to the magnetic field that determines an almost constant resistance force along the stroke, a very advantageous quality for the application of the device. Conversely, the magnetic force between two facing magnetic poles would vary in magnitude—classically—as the squared distance, thus of limited practical value. Said orientation of the polar axis, on the other hand, achieves that, for the entire relative stroke of the two structures, only the portions at the entrance of the combs interact magnetically in order to generate the force. And thanks to this particular magnetic field configuration the force remains approximately constant.

For the maximum constancy of the force, preferably said polar axis is directed orthogonally to a flat surface of the element, in particular when the element has e.g. a parallelepiped or laminar shape.

Another advantage of the device is the ease with which one can modulate the resistance force. Indeed, advantageously the two structures may be relatively movable along an axis orthogonal to the direction of the channels formed by the elements of a structure, that is, along a direction that involves greater or lesser penetration of the elements of one structure into the channels of the other. In this manner the interaction and overlap surface between the elements of the two structures varies. By overlap of the surfaces of two adjacent elements and belonging to a different structure it is here understood the area of the orthogonal projection of an element onto the other.

This second degree of freedom allows easily adjusting the generated resistance force. The device for that purpose may optionally comprise a positioning mechanism or device for varying the distance, measured perpendicularly to said channels, between the elements of the two structures.

The magnetic material in the elements of the first structure may be a permanent magnet (e.g. based on NdFeB, polarized in the median plane), to simplify the structure, or may be an electromagnet and require power supply.

The shape of the elements in the two structures may vary. It is preferred, for simplicity, that overall the elements form walls being flat and parallel to each other (comb). In that case, advantageously said polar axis may be oriented perpendicular to the flat walls, wherein two opposite faces of the element are the location of the two magnetic poles.

The single element may have a parallelepiped shape, with square or rectangular face, with thickness less than the length of the shorter side of the face.

The second structure's comb of elements may be
 composed of ferromagnetic material, e.g. with low carbon content; and/or
 a single piece with a number of plates or elements equal to the number of the rows of the magnetic elements plus one, or may be composed of a series of juxtaposed U-shaped components, in a number equal to the number of rows of magnetic elements; and/or
 made as a single piece (monolithic) or produced as lamination pack (laminations are sheared with the desired shape and then stacked to obtain the desired thickness).

One can adapt the device to equip several types of existing machines and with different type of physical exercise. The linear translation of the two structures generates a resistance force transferable to a linearly oscillating object or to a rotating object. The force can be transferred by cables, chains, shafts or rigid arms.

For the linear translation one or each structure may be mounted on a carriage, e.g. with wheels sliding on a guide integral to a frame of the device. Preferably, for constructive simplicity, one structure is fixed to the frame.

Preferably, said translation movement has a stroke of 30 cm to 140 cm, in particular about 60 or 100 cm. Preferably the channels are mutually parallel and straight.

Preferably, in all variants the linear translation takes place with reciprocating motion to make the fitness exercise repeatable or to create a production cycle for a mechanical member of an industrial machine.

The facing surfaces of the interdigitated elements may be flat or curved, e.g. complementary to each other, to enclose all or the most magnetic flux of the magnets thereby maximizing the resistance force. In particular, the profile of said elements may be concave, convex or stepped or may comprise the series of two or more concavities and/or convexity. The beneficial effect is to modulate easily the resistance force with programmable or repeatable trend.

Between the two structures there also develops a force perpendicular to the relative sliding direction of the structures. If this second force puts excessive stress on the distance adjustment mechanism, one can advantageously lighten the load with elastic elements (e.g. compensation springs) to generate a contrary force.

To better balance the second magnetic force, it is advantageous that the first structure, with respect to an imaginary plane, comprises said elements arranged comb-like both on a side of the plane and on the opposite side. In particular, for maximum symmetry, the first structure may comprise for each element present on one side of the plane a corresponding element on the other side of the plane, such two elements on opposite sides being coplanar. The elements are placed, then, as two combs placed back-to-back against one another and with the teeth of the combs extending in opposite directions.

Each element placed on opposite sides of said plane is interdigitated on (that is placed inside the channels of) a structure built as the second structure. In this way, on each side of the plane there develops one said second force, but the resultant is zero.

The distance adjustment between the first and second structure (and therefore the degree of interpenetration between the magnetic and ferromagnetic elements) may be accomplished in several ways. E.g. by constraining one or each structure to the frame of the device with one or more deformable or extendable connection members, e.g. hydraulic rams, linear actuators or a screw/female-screw-mechanism, wherein one of the screw and the female-screw is connected to one structure and the other is connected to the frame. If the constrained structure is movable relative to the other, said connecting members are coupled to such structure through sliding guides or sliding means, so as to allow the displacement thereof relative to the other structure.

With or without connection members, one structure may move linearly relative to the other by means of two guides on each of which there slide two recirculating-balls skids or wheels on idle pin, fixed laterally to the movable plate and sliding on a rail. Such rail may be made of or embedded in an aluminum extrusion forming the housing or the frame of the device.

By using at least two connecting members for connecting, e.g. for suspending, to the frame two aligned points of a structure, it may be inclined with respect to the linear sliding direction of the other structure. In this way one can adjust independently the interpenetration degree of the elements in correspondence of the two ends of a structure, and by doing so different patterns for the resistance force as a function of the relative position of the two structures can be achieved.

By using connection members for connecting, e.g. for suspending, to the frame three or four points of a structure, not only can it tilt with respect to the linear sliding direction of the other structure but also roll. In this way other trends for the resistance force as a function of the relative position of the two structures can be obtained.

Preferably the elements on the first structure are arranged on rows with a different starting point with respect to an axis orthogonal to the sliding direction. The purpose is to avoid discontinuity in the resistance force when, at the end of the stroke, the elements of one structure are all come out of the channels of the other.

To maximize the magnetic mass, the device may comprise a spring cooperating with the magnetic packet of a structure. By suitably orienting the ferromagnetic elements a combined effect can be obtained between the magnetic force and the elastic force so as to develop a constant load to the user.

Each element of the first structure may also be composed of two outer ferromagnetic steel plates and a core of magnet or by a core of ferromagnetic steel plate and externally two plates of magnets oriented in the same direction. This system allows to reduce the air gap and to keep unaltered the properties of the magnet and the effect of the latter on the plates in the air gap.

Another aspect of the invention is a method for generating a force, e.g. a resistance force, in a machine for physical exercise wherein the force is applied to an object movable by a user via muscular effort or to a mechanical member of an industrial machine, wherein the force is obtained by the mutual magnetic interaction between parallel rows of magnets and parallel rows of pieces (e.g. made or composed of ferromagnetic material, or by other magnets) responsive to the magnetic field of the magnets, wherein the magnets of one row are placed in parallel channels defined by the pieces of the other row, and the rows can slide relatively along a sliding direction, and the magnets comprise a polar axis that is transverse (preferably: substantially orthogonal) to the sliding direction and is facing one of said pieces.

The variants described above for the machine are likewise usable in the method. In particular:

to adjust or program the resistance force, the distance is varied between the parallel rows of magnets and the parallel rows of pieces in a perpendicular or transverse direction to the direction of relative sliding of the rows; and/or to adjust or program the resistance force, the parallel rows of magnets are inclined with respect to the parallel rows of pieces, or vice versa, with respect to the direction of relative sliding of the rows; and/or to adjust or program the resistance force, the ridge profile of the parallel rows of magnets and/or the parallel rows of pieces is shaped.

Preferably, the magnetic parts and/or the magnetic elements defined above have all polar axis oriented with polarization in the same direction.

The advantages of the invention will be more apparent from the following description of preferred embodiments of the machine, making reference to the attached drawing in which FIG. 1 shows a known machine;

FIG. 4 shows an axonometric view of a resistance force generation system for the machines of FIG. 2 or 3;

FIG. 5 shows a sectional view according to the plane VV of FIG. 4;

FIGS. 6 and 7 show isometric views of the system of FIG. 4 in two different configurations, and with parts removed;

FIGS. 16:17 show isometric views of a sixth resistance force generation system in two different configurations;

FIG. 18 shows an axonometric view of a seventh resistance force generation system;

FIG. 19 shows an isometric view of an eighth resistance force generation system.

Figure 26:
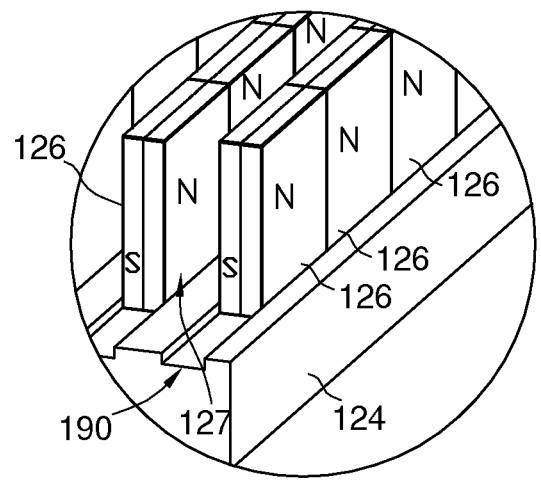
Figure 20:
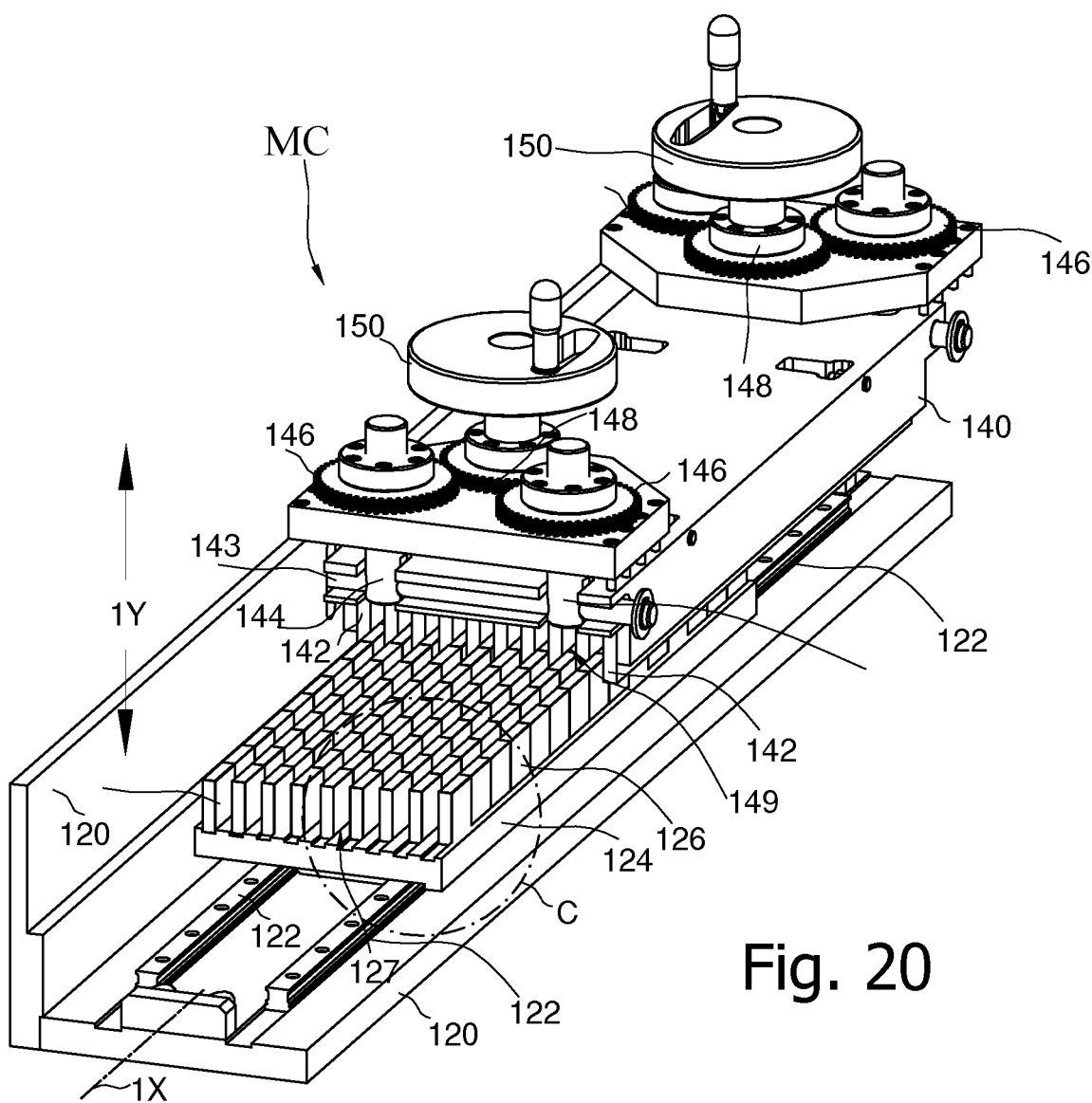
Figure 21:
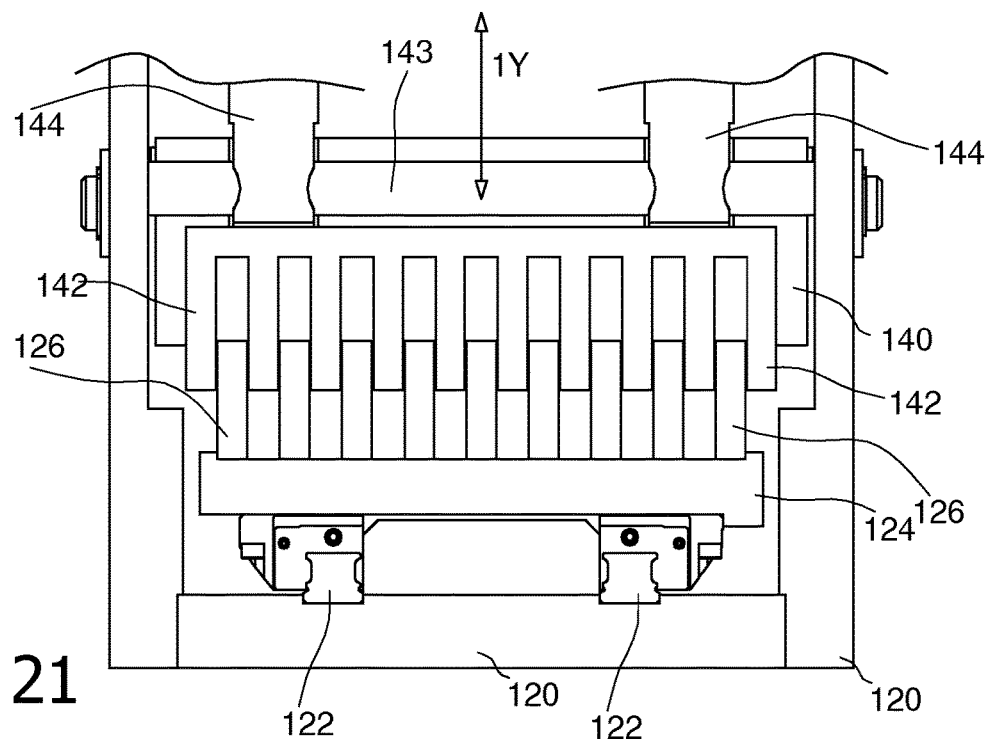
Figure 25:
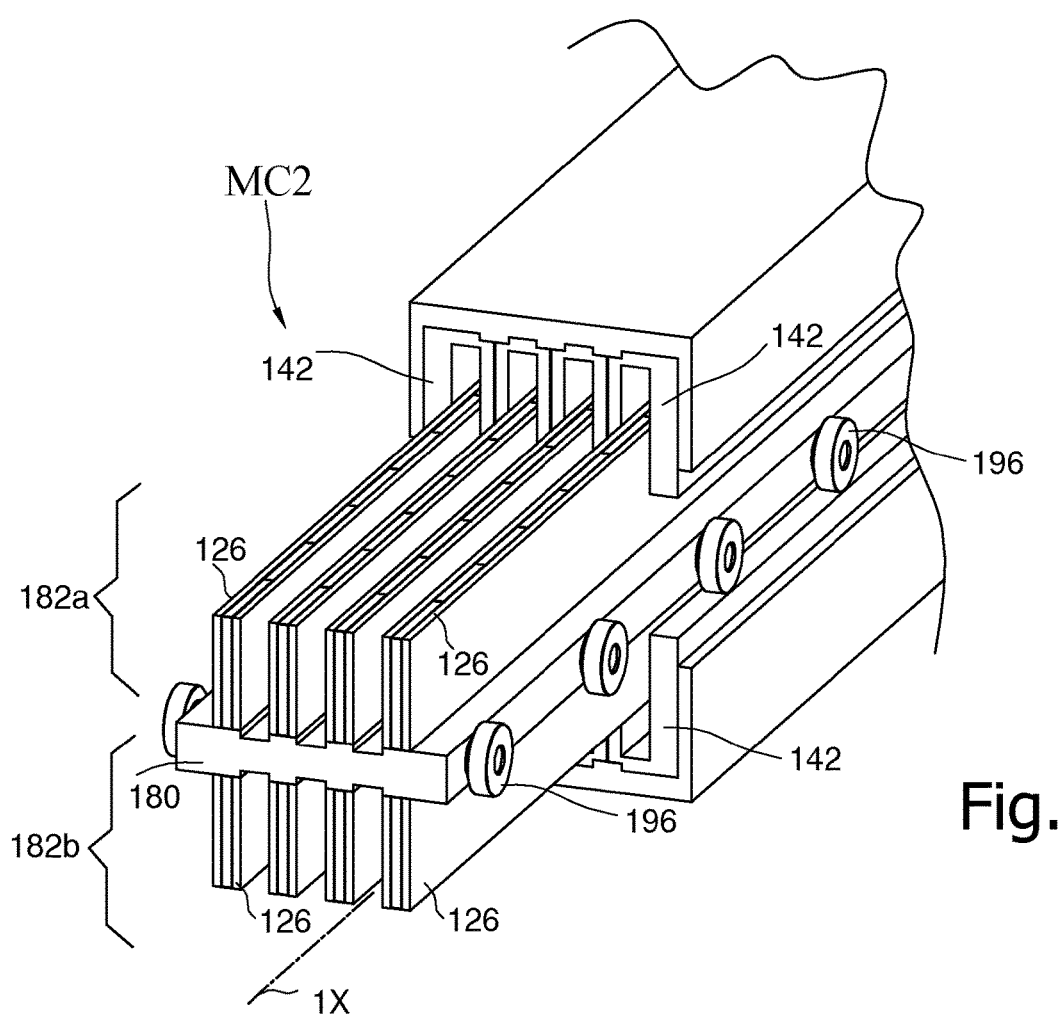
Figure 22:
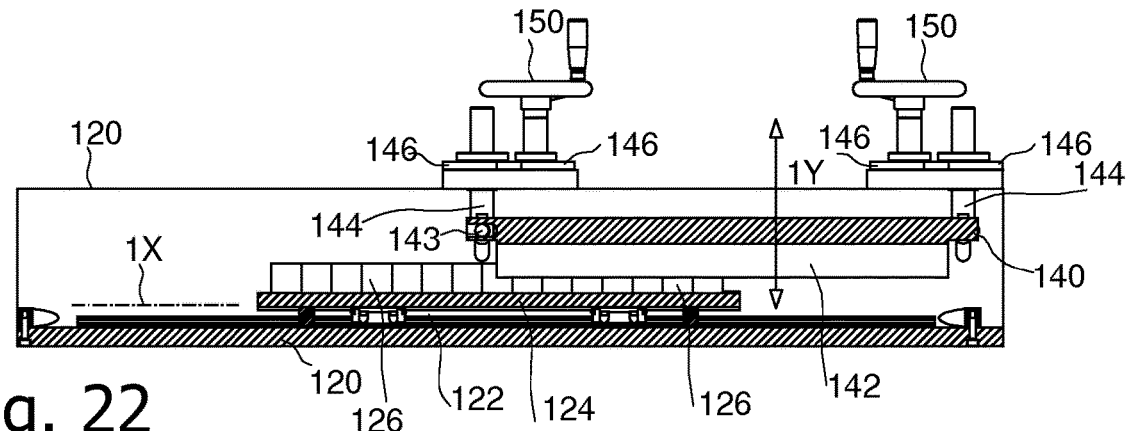
Figure 23:
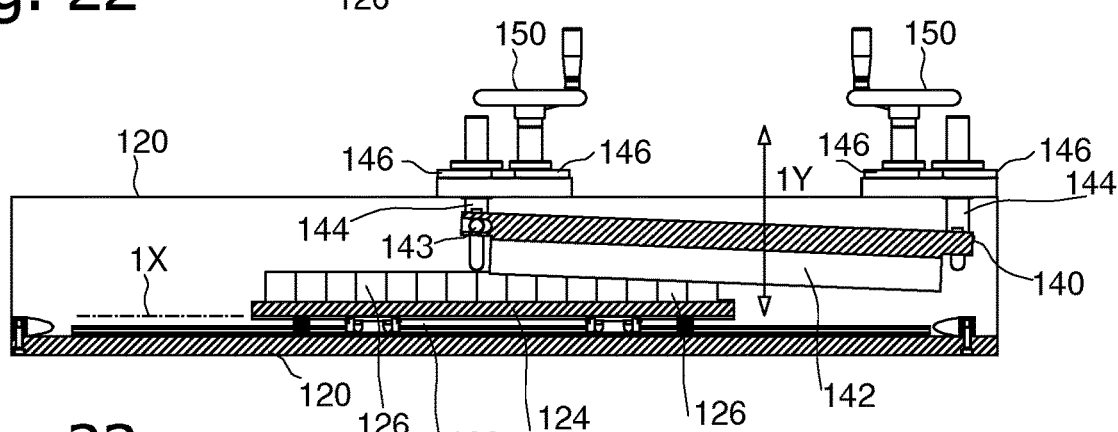
Figure 24:
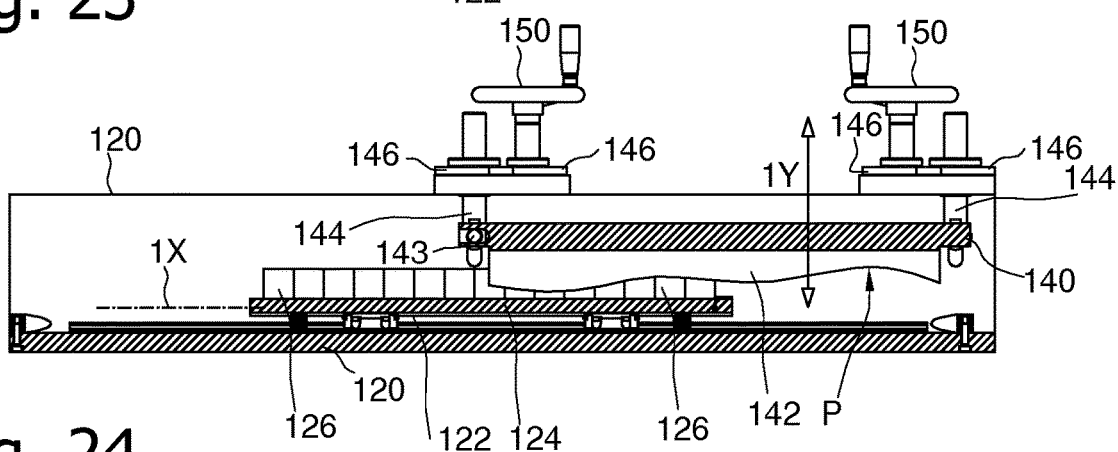

FIG. 20 shows an isometric view of a ninth device according to the invention;

FIG. 21 shows a front view of the device of FIG. 20;

FIG. 22 shows a cross-sectional side view of the device of FIG. 20;

FIGS. 23:24 show a cross-sectional side view of variants for the device of FIG. 20;

FIG. 25 shows a view of a variant of comb-like structure;

FIG. 26 shows an enlarged view of circle C of FIG. 20.

Figure 27:
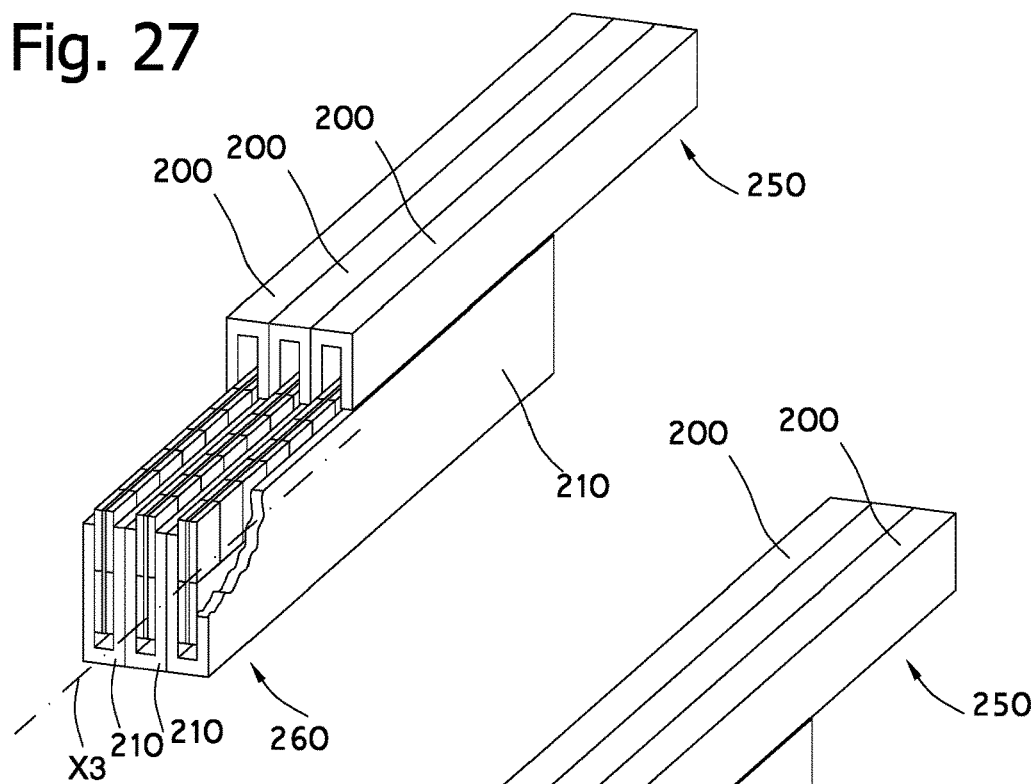
Figure 28:
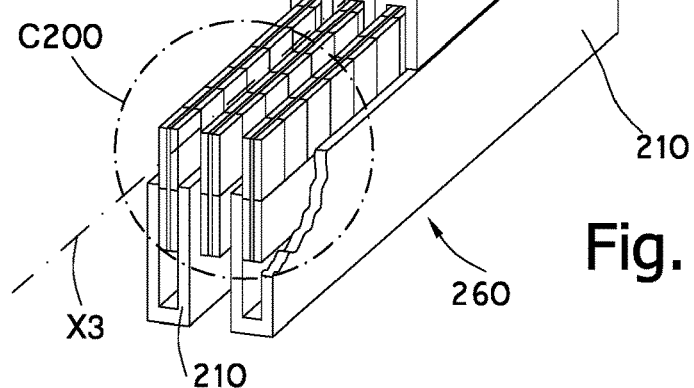
Figure 29:
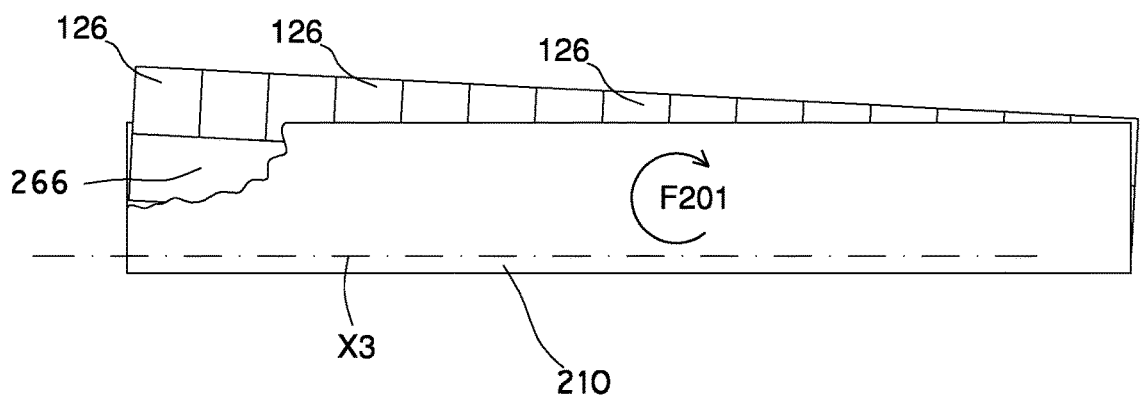
Figure 30:
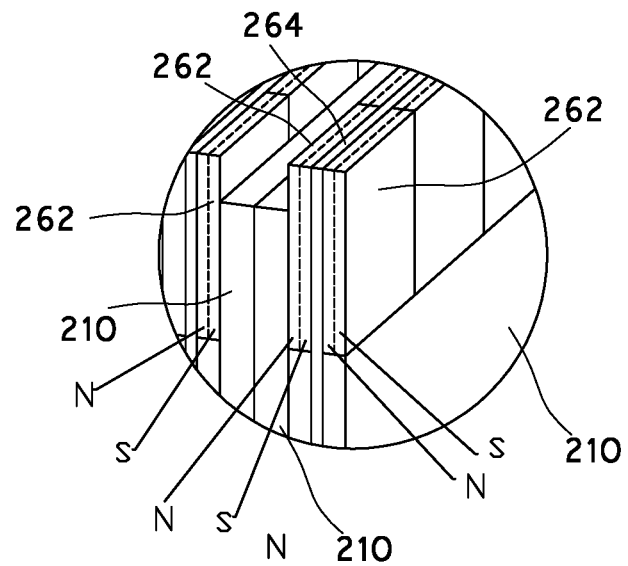
Figure 31:
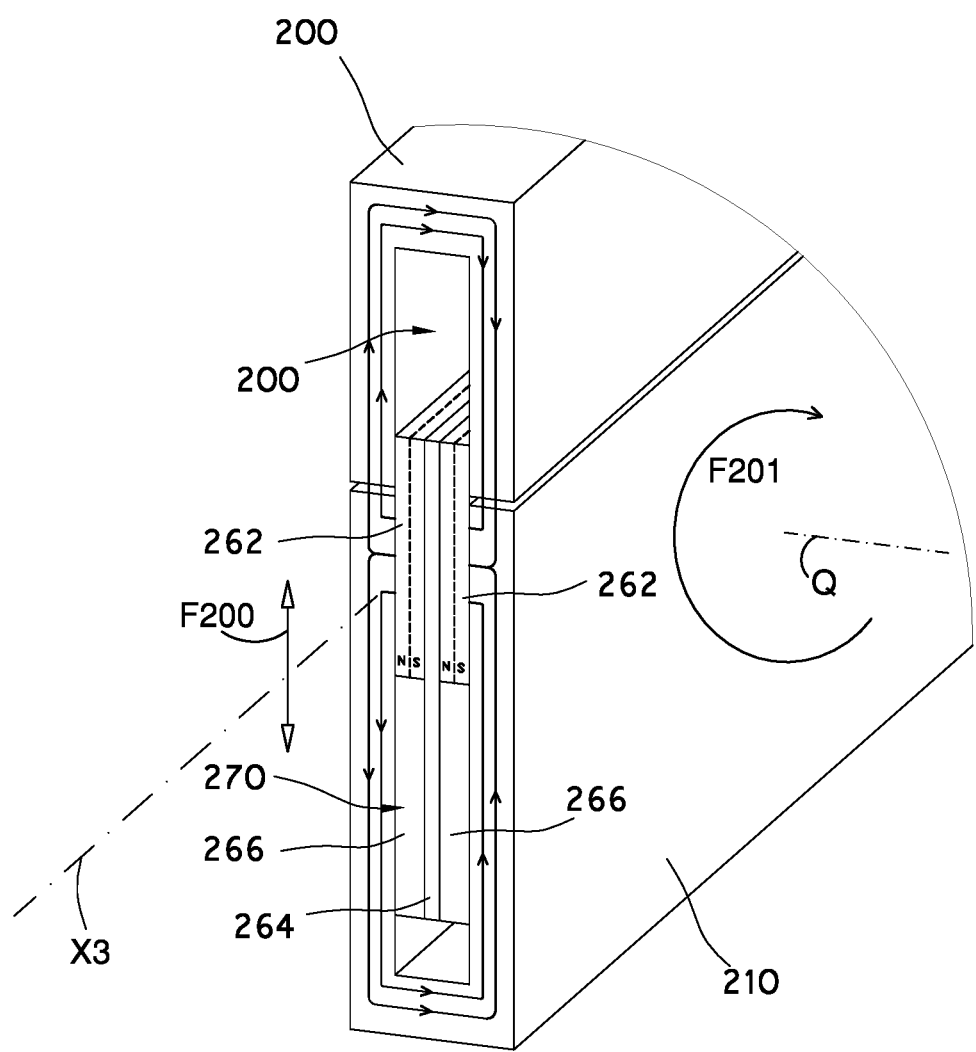
Figure 32:
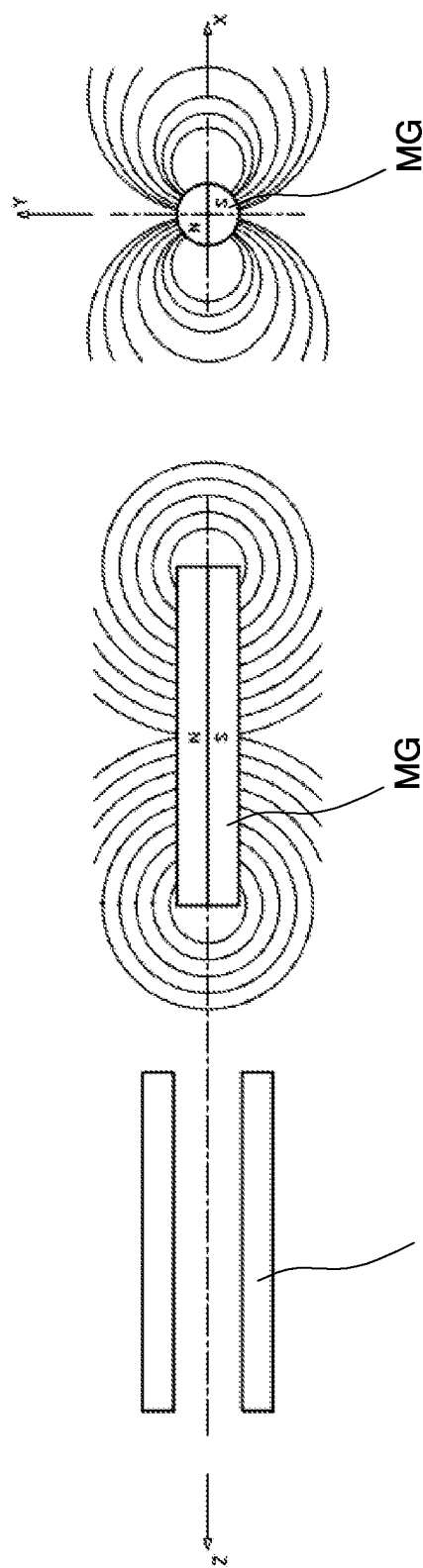
Figure 33:
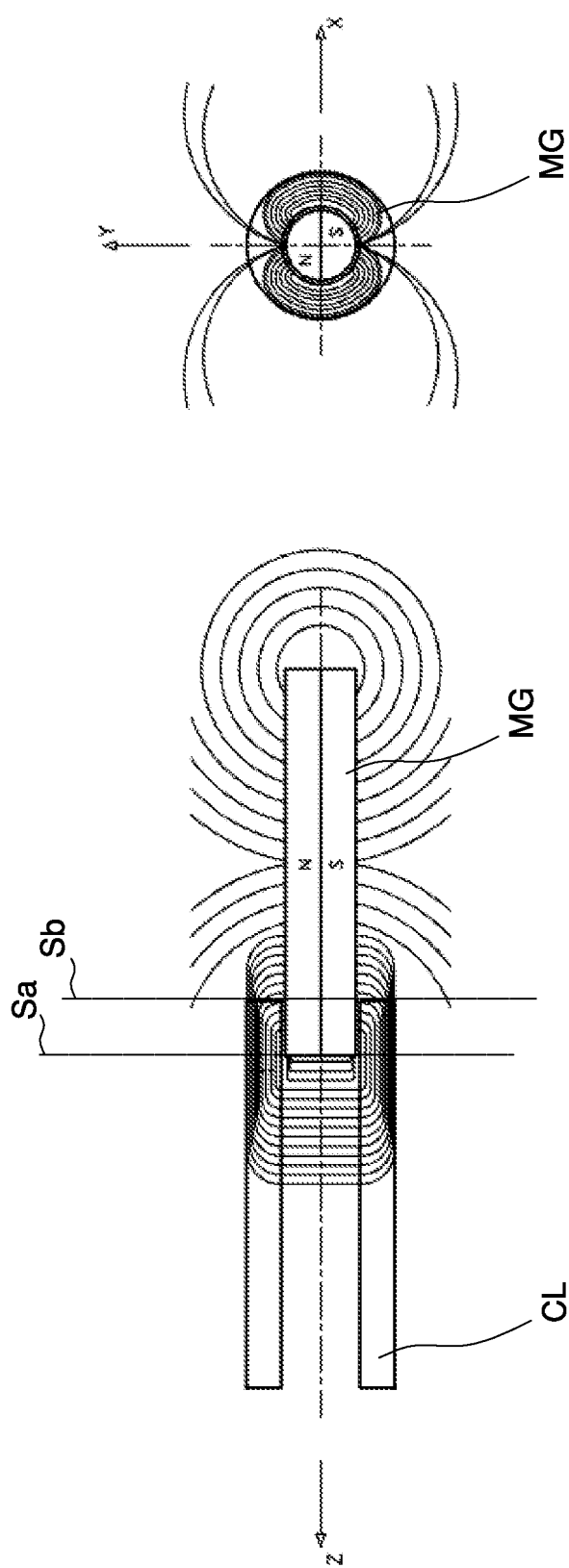

FIGS. 27-28 show a three-dimensional view of a variant of the comb-like structure;

FIG. 29 shows a side view of the variant of FIG. 27;

FIGS. 30-31 show details of the variant of FIG. 27;

FIGS. 32-33 show a schematic diagram of operating principle for a device according to the invention.

In the figures same numbers indicate identical or conceptually similar parts. In order not to crowd the drawings some parts are not numbered.

Figure 1:
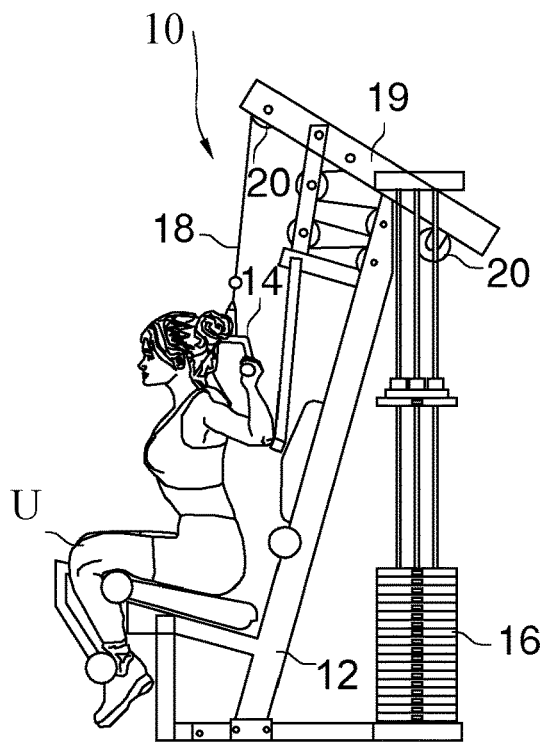

The known machines 10 for physical exercise, such as in FIG. 1, usually comprise a frame 12 for supporting a user U, an object 14 (e.g. a handlebar) displaceable by the user U via muscle effort and connected to a device for generating a resistance force, in the example a bundle of weights 16 whose weight via a rope 18 and pulleys 20 is returned to the object 14, often through an oscillating lever 19. Here the object 14 is pulled linearly.

The machine of FIG. 1 is modified into a machine MC according to the invention (FIG. 3) by applying to the rope 18 a different device M for generating the resistance force. The same applies to machines in which the object 14, e.g. a handlebar, is moved circularly, see FIG. 2.

We will now describe some variants M1, M2, . . . M8, MC, MC2 of the device M. In all the drawings the letters "S" and "N" indicate the South or North magnetic poles of the magnetic or magnetized parts. Although the drawings show dividing lines between parts with different poles, not necessarily there are two overlapping parts with oriented polarities but there may be a single magnetized piece.

A first variant M1 (FIGS. 4-7) comprises a linear guide or track 30 on which is slidingly mounted by wheels 34 a carriage 32. In a cavity of the guide 30, placed flush with the sliding plane, there is a permanent magnet 36 which can interact with a plate 38 made of ferromagnetic material mounted on the bottom of the carriage 32.

The magnet 36 and the plate 38 have flat facing surfaces U1, U2 (which extend respectively along two parallel axes Y, X) and are mounted so that the carriage 32 can slide relatively to the plate 38 along the X axis (which is also that of the guide 30). The motion modifies progressively the geometric overlap between the magnet 36 and the plate 38, and therefore, thanks to the magnetic interaction, a mutual attractive force Fm develops that sucks in the carriage 32 above the plate 38 and replaces that of the known weights 16. Note that the polar axis of the magnet 36 is substantially perpendicular to the surface U1 (namely, substantially orthogonal to the sliding direction of the carriage 32).

Preferably, the magnet 36 comprises inclined planes 40 which rest on complementary inclined planes 42 of the guide 30. By a threaded pin 44, which engages in a counter-threaded hole in the magnet 36, the magnet 36 can be moved along the X axis, and thus the distance perpendicularly to the axis X with respect to the plate 38 can be varied. In this way the air gap between the two magnetically interacting parts is modified and the generated resistance force Fm is varied.

Figure 8:
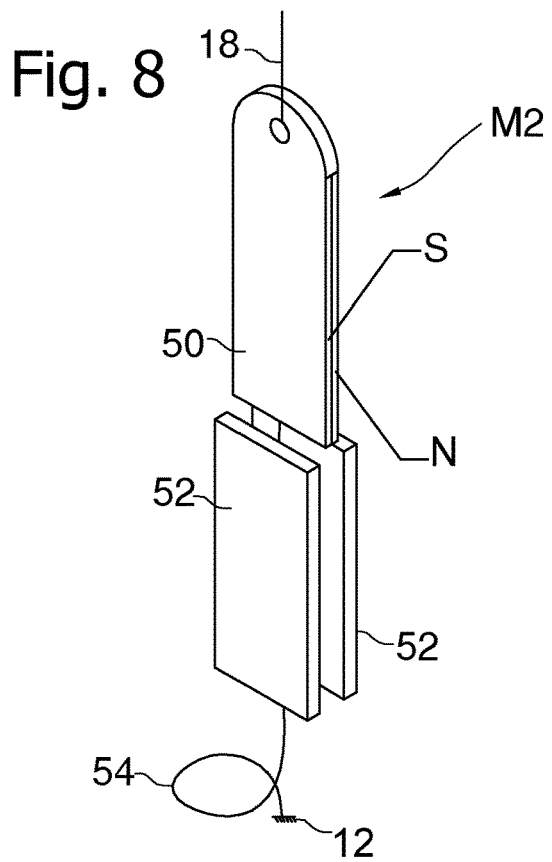
FIGS. 8 and 9 show axonometric views of a second resistance force generation system in two different configurations.
Figure 9:
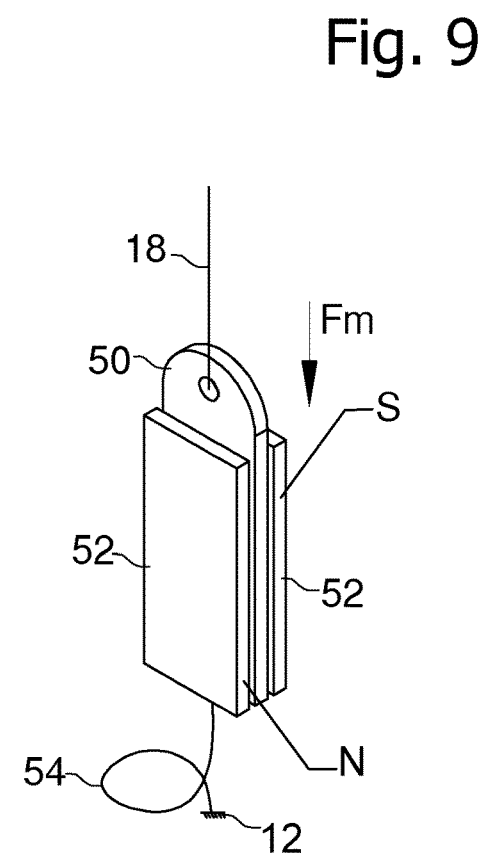

A second variant M2 (FIGS. 8-9) comprises a permanent magnet 50 mounted for sliding inside the slot or cavity present between two flat facing plates 52 made of ferromagnetic material, e.g. fixed on the frame 12. The magnet 50 is connected to the cable 18, and like in the variant M1 is forced to penetrate between the plates 52 by the suction of the magnetic attraction.

Figure 2:
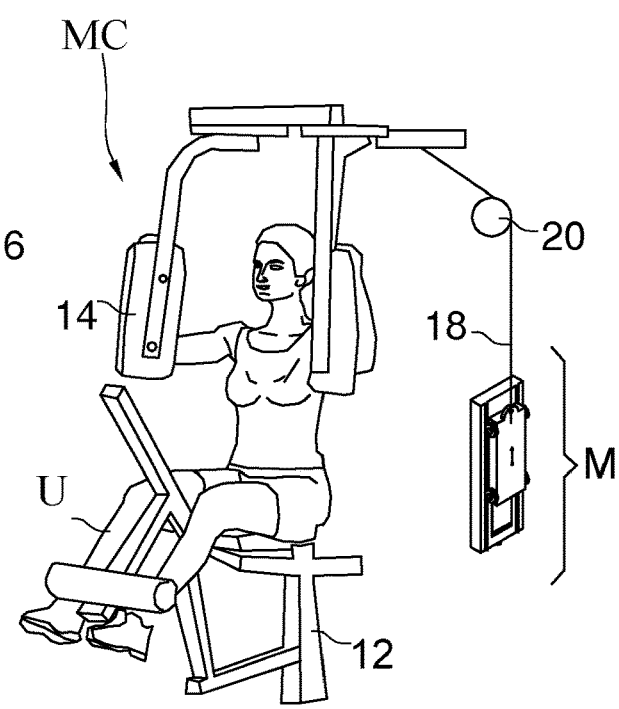
FIG. 2 shows a machine according to the invention.
Figure 3:
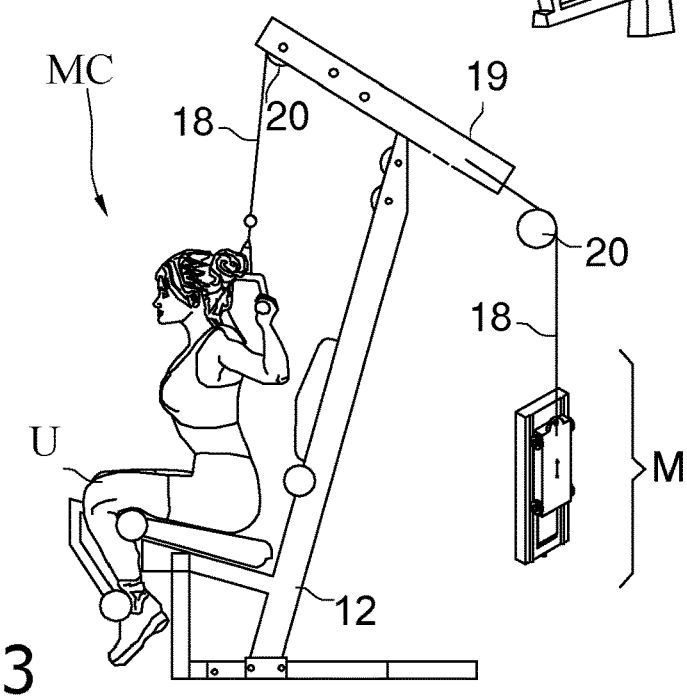
FIG. 3 shows a second machine according to the invention.
Figure 10:
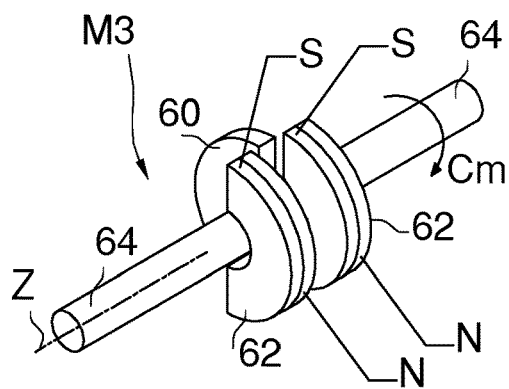
FIGS. 10 and 11 show isometric views of a third resistance force generation system in two different configurations.
Figure 11:
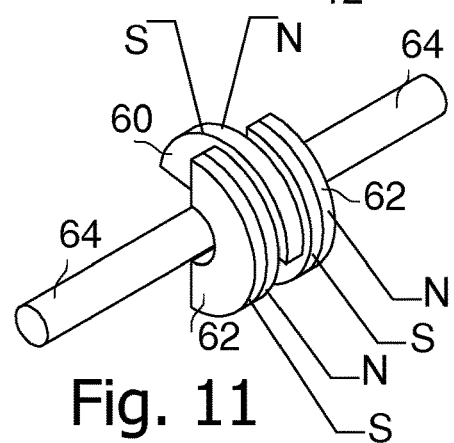

A third variant M3 (FIGS. 10-11) is exploitable for machines like in FIG. 2, and comprises a piece 60 made of ferromagnetic material, e.g. in the shape of semi-disk, mounted to rotate about a Z axis and to move into the slot between two flat facing magnets 62, e.g. shaped as a semi-disk and fixed on the frame 12. The piece 60 is connected to the cable 18 or the object 14 by means of a rotatable shaft 64, and is forced to penetrate between the plates 62 by the suction of the magnetic attraction.

Therefore on the shaft 64 a torque Cm antagonist to the user U's movement is generated. The Z axis is preferably orthogonal to the surfaces of the semi-discs. Note that the polar axis of the magnets 62 is substantially perpendicular to their flat surface (that is, parallel to the Z axis).

Figure 12:
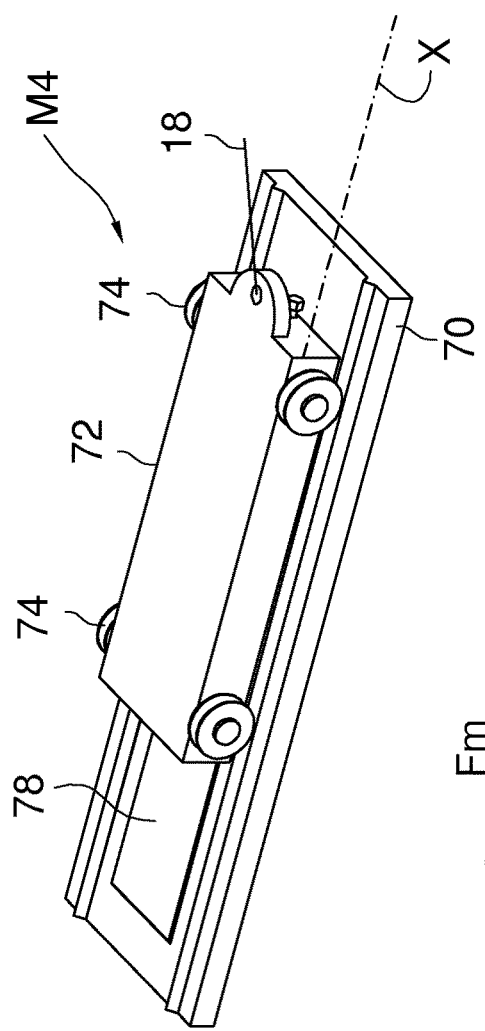
FIGS. 12-14 show isometric views of a fourth resistance force generation system in two different configurations.
Figure 13:
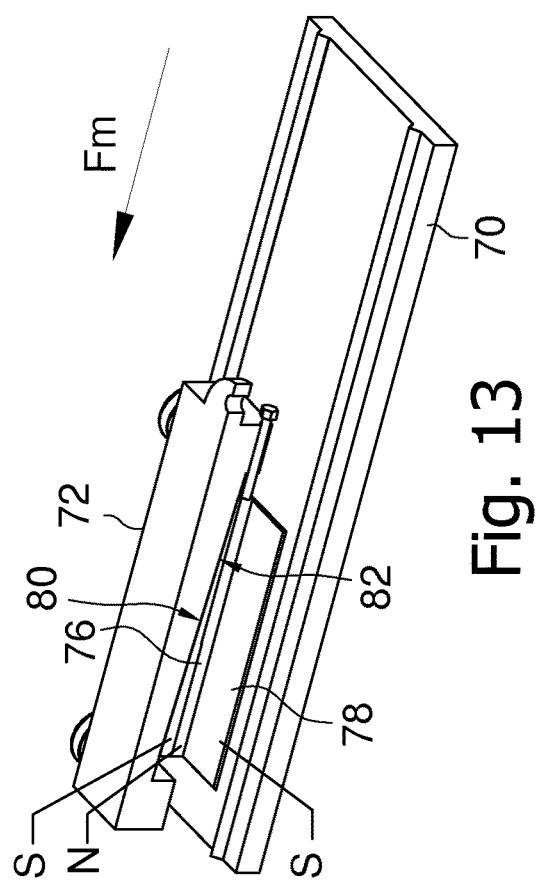
Figure 14:
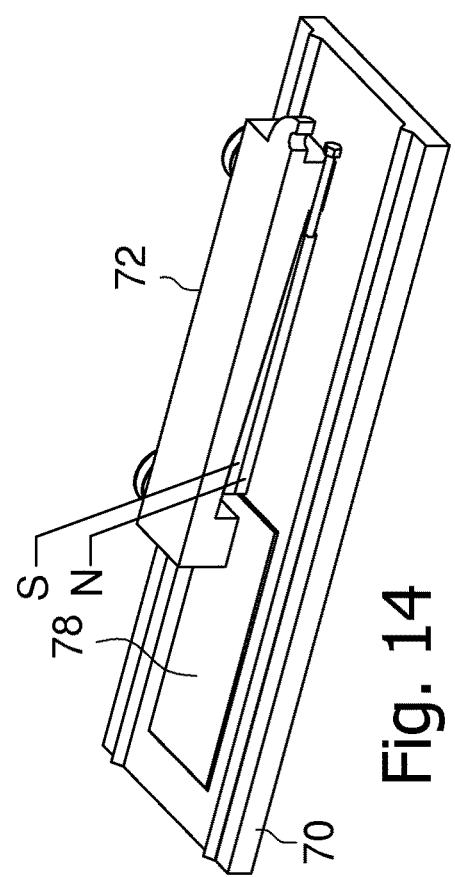

A fourth variant M4 (FIGS. 12-14) comprises a linear guide or track 70 on which is slidingly mounted along the axis X via wheels 74 a carriage 72. In a cavity in the bottom of the carriage 72, placed flush with the bottom, there is a magnet 76 that can interact with a plate 78 of ferromagnetic material mounted on the surface of the guide 70.

The dynamic behavior and the geometry of the flat facing surfaces and the polar axes are analogous to the variant M1.

Preferably the flat surface of the magnet 76 is displaceable relative to the carriage 72 along a direction orthogonal to the axis X. To this aim, it can comprise an inclined plane 80 which rests on a complementary inclined plane 82 in the carriage 72. By a threaded pin 84, which engages in a counter-threaded hole in the magnet 76, the magnet 76 can be moved along the X axis, and thus vary its distance perpendicular to the X axis with respect to the plate 78. In this way the air gap between the two magnetically interacting parts is changed and the generated resistance force Fm is varied.

The next variants M5-M8 are characterized by the fact that the parts that attract or repel by magnetic force slide one inside the other and—as before—the polar axes of the magnets are substantially orthogonal to the sliding/extraction direction. The variable s indicates the distance between the inserted end of the contained element and the end of the containing element opposite to the extraction direction. The axial length of the containing element is indicated by L.

A fifth variant M5 (FIGS. 16-17) comprises a hollow cylinder 90 made of ferromagnetic material (shown in cross-section) with inner surface U4 and a diametrically polarized magnet 92 which has the shape of a bar with a cross section complementary to the internal axial cavity of the cylinder 90 and has outer lateral surface U3. The inner surface of the cavity and the outer surface of the magnet 92 are parallel and can slide relatively along the axis X. The magnet 92 is attracted into the cylinder 90, and pulls the rope 18.

Figure 15:
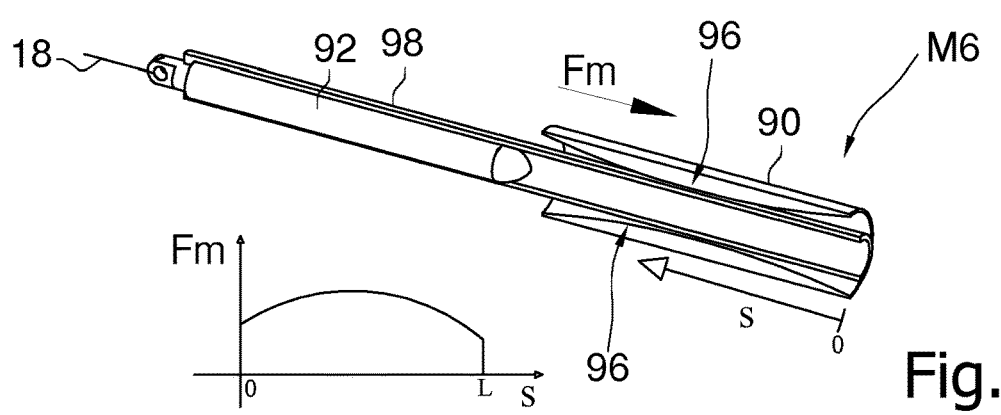
FIG. 15 shows an axonometric view of a fifth resistance force generation system.

In a sixth variant M6 (FIG. 15) the trend of the resistance force Fm as a function of the distance s between the magnet 92 and the cylinder 90 is programmed through an internal shaping (convexity) 96 of the inner surface of the cylinder 90 (shown in cross-section). Therefore the air gap that the magnet 92 "sees" is not constant as in FIG. 17 but varies (as a function of s) as the magnet 92 enters inside the cylinder 90. FIG. 15 also shows a resulting descending-trend example for the resistance force Fm as a function of s. The force Fm during the extraction of the magnet 92 from the cylinder 90 has initially a low value (s≈0), grows in intensity in an intermediate extraction phase (s≈L/2), and increases again at the terminal phase of the extraction (s≈L).

In a seventh variant M7 (FIG. 18) the trend of the resistance force Fm as a function of s is programmed through a stepped internal shaping 99 of the inner surface of the cylinder 90 (shown in cross-section). FIG. 18 also shows an example of a resulting stepped trend for the resistance force Fm. When the magnet 92 is pulled out from the cylinder 90 the force Fm decreases by steps proportional to the change in inner diameter of the cylinder 90.

To facilitate the sliding movement of the magnet 92 in each variant one can tuck into the cylinder 90 a tubular sleeve made of diamagnetic material, preferably longer than the cylinder 90.

In an eighth variant M8 (FIG. 19) the trend of the resistance force Fm as a function of s between the magnet 92 and the cylinder is programmed by adjusting the width of the air gap between the magnet 92 and the cylinder. The cylinder, indicated here by 100, has expandable structure, being e.g. formed by a bundle of ferromagnetic bars which enclose and rest on the guide 98 and are held together by an elastic annular element. The guide 98 has, in this example, inclined planes 102 in contact with inclined planes 104 on the inner surface of the cylinder 100. By axially moving the guide 98 the planes 102 are moved on the planes 104, which are pushed more or less toward the outside by changing the section of the cylinder 90, and thus the air gap seen by the magnet 92.

FIG. 19 also shows an example of resulting decreasing trend for the resistance force Fm as a function of s. The force Fm is almost constant throughout the extraction stroke of the magnet 92 (0≤s≤L), being however adjustable by means of the radial receding of the elements 104 with respect to the axis of the magnet 92.

Note that by what has been said before, the polar axis of the magnet 92 is substantially orthogonal to the surface U3 and orthogonal to the sliding direction.

As variants e.g. one can have that:
the distance between the plates 52 or between the magnets 62 may be adjustable; and/or
the magnet 50 or 92 may be mounted on a guided carriage, as in the variant M1; and/or
the stroke of the carriage 32 or 72, of the magnet 50, of the magnet 92, or of the shaft 64 may be limited by a safety cable 54 anchored to the frame 12.

Note that by reversing the polarity N, S and/or by replacing the described parts made of ferromagnetic material with a magnet with opposite polarities to the other, a repulsive force can be generated. By appropriately varying the turn of the rope 18 or 54 the resistance force on or of the object 14 can be reversed.

In the known machines 10 for physical exercise, such as in FIG. 1, the device for generating a resistance force may be replaced by a device MC according to the invention (FIG. 20).

The device MC comprises a box-shaped outer frame 120 on the bottom of which is mounted a linear rail 122 with axis 1X.

On the rail 122 there can slide along 1X a structure or table 124 equipped superiorly with n aligned rows of permanent magnets 126, see also FIG. 26. The magnets 126 mounted on the table 124 are all oriented with polarization in the same direction (see FIG. 26) and in a direction orthogonal to the axis 1X.

The rows of magnets 126 define between each other empty channels 127 and are surmounted by a plate 140 equipped with comb-like arranged blades 142 being constituted of ferromagnetic material. The blades 142 delimit empty channels 149, too.

The blades 142 have nearly the same overall length of a row of magnets 126 and are arranged between the void spaces 127 present between the rows of magnets 126. Analogously the magnets 126 are similarly arranged in the channels 149 (interdigitated arrangement). The polar axis of the magnets 126 is oriented approximately orthogonally to the lying plane of the blades 142.

FIGS. 20 to 26 show a configuration which provides for the permanent magnets 126 to be fixed directly to the part or the movable structure and for the blades 142 to be fixed on plate 140. Nothing prevents, however, that the magnets 126 are fixed to the fixed part while the blades 142 to the movable part. In particular, the permanent magnets 126 are glued inside superficial grooves 190 of the plate 120 (FIG. 26).

Starting from a position of overlap between the magnets 126 and the blades 142, to extract the comb of magnets 126 from the comb of blades 142 one needs to apply a (approximately constant) force along 1X equal and opposite to that which is developed by magnetic way. Upon releasing the table 120 when it is extracted, the latter will be attracted with a force approximately constant along 1X and towards the magnets 126.

By keeping the interpenetration section between the magnets 126 and the blades 142 constant throughout the overall stroke of the table 120, the value of the magnetic force developed along the whole stroke will be nearly constant.

The strength of the magnetic interaction along 1X grows with increasing penetration (along the axis 1Y, FIG. 3) between the magnets 126 and the blades 142. Conversely it decreases when the ferromagnetic comb moves away from the magnets 126. Considering the case of blades 142 with homogenous profile (FIG. 23), one can adjust the force along 1X by varying the interpenetration distance between the magnets 126 and the blades 142. In particular, if during the extraction stroke said interpenetration section reduces, the magnetic force decreases during the extraction phase of the plate 120 and increases during the return stroke. If said interpenetration section increases the contrary happens.

The plate 140 is comprised in a height and angle adjustment mechanism with respect to the plate 120. The plate 140 can be moved along an axis 1Y orthogonal to the axis 1X. In particular the two ends of the plate 140 are pivoted about a horizontal axis by two horizontal bars 143 each supported by two threaded columns 144, which are each connected to a toothed wheel 146. Each pair of wheels 146 relative to a side of the plate 140 engages on a sprocket 148 equipped with a flyer 150.

Through the two flyers 150 one can set independently how much the front and rear part of the plate 140 is spaced from the table 120. By doing so one can accomplish a height adjustment (FIGS. 21 and 23) with respect to the sliding plane of the blades 142 or to the axis 1X. From this there follows a dynamic change of the facing overlapping area for the elements 126, 142 to which corresponds a different profile for the resistance force.

Another possibility for varying the force along 1X is to shape the profile of the blades 142 (FIG. 24, crest profile P), so that the magnetic force can be modulated at several points of the extraction or insertion stroke of the table 120. The force along 1X can thus be programmed as a function of the instantaneous interpenetration section between the elements 126, 142.

FIG. 25 shows a variant of device MC2 for the arrangement of the combs constituted of the elements 126, 142. A movable and sliding table 180 (functionally similar to the table 120) is equipped this time with two equal and counterposed combs 182a, 182b composed of elements 126. The two combs 182a, 182b are present on the opposite surfaces of the table 180, preferably arranged so that a row of elements 126 on one side corresponds to a coplanar row on the opposite side. Each comb 182a, 182b is partially inserted, with interdigitated configuration, in a cooperating comb formed by blades 142 of ferromagnetic material. The combs formed by the blades 142 are equal.

The table 180 can be moved along 1X through wheels 196 with respect to fixed blades 142, integral with the frame of device MC2.

The arrangement of elements 126 on the board 180 requires that two magnetic forces develop orthogonal to the axis 1X, i.e. one between the comb 182a and the overlying blades 142 and another between the comb 182b and the underlying blades 142. Given the geometric symmetry of the system, these two mentioned forces are almost equal but opposite. Then on the table 180 the resultant of the two forces is null and there is no problem of friction or strain on the wheels 196.

The table 180 is optional, the combs 182a, 182b being able to be condensed into a single row translatable with respect to the upper and lower combs composed of blades 42.

In any variant described above or below, one can reverse the position of the magnetic parts with the ferromagnetic ones, and/or rotate the orientation of the elements 126, 142, so that e.g. they extend inside horizontal planes and not vertical planes as shown.

With reference to FIGS. 27-31 now another variant of comb-like structure is described, exploitable to make or modify that of the previous figures. For simplicity, the remaining structure of the machine, similar to the preceding, is omitted.

This variant allows eliminating the aforesaid elastic elements for avoiding overstresses, and it generally comprises a central fixed part, to which magnets are fixed, which is stationary with respect to the development direction of the resistance force and has adjustable position perpendicularly to such direction, for determining the value of the developed force;

a movable part which is translatable with respect to the fixed part along said development direction and which has a shape such as to surround the fixed part.

This solution, in the position of full overlap between magnets and ferromagnetic material surrounding the movable part, allows adjusting the position of the magnets without the aid of excessive loads because the influence of the magnetic field cancels by the complete circulation of the flux within the ferromagnetic material.

This solution advantageously lends itself to modularity. The number of modules determines the maximum available force exercisable by the machine.

The comb structure comprises two components of ferromagnetic material 200 and 210, preferably C-shaped and placed against one another in order to delimit between the attached ends of the C a central channel 220.

The component 200 is part of a slide, and can move relatively to the component 210, which is fixedly connected to the machine.

The components 200, 210, here for simplicity described individually, are part of an array of identical elements placed side by side to create a comb structure, respectively indicated with 250 and 260 (see FIGS. 26-28). The operation of the comb structure is based on that of the individual component 200, 210.

A central component 270 supports magnets 262 on a central core 264, for example a foil, made of ferromagnetic material. This core carries, at the bottom, on both sides, two bars 266, of same thickness and same height as the magnets 262, and is made in amagnetic material, e.g. aluminum. The magnets 262 are on the bars 266, in rows and on each side of the core 264, and have polar axis with the same direction (perpendicular to the planes containing the two ends of the C).

In FIG. 30, which shows an enlargement of the components 200, 210, the orientation of the polar axis for the magnets 262 can be appreciated.

In FIG. 31, which shows an enlargement of the circle C200 of FIG. 28, their relative disposition can be appreciated.

The conformation of this variant allows adjustment of the interference between the comb 250 and the magnets 262, and therefore the adjustment of the force generated by the magnets 262 during the motion of the comb 250. In the position of complete overlap between the comb formed by the magnets 262 and the ferromagnetic comb of the structure 250, one can adjust the position of the magnet 262 in the channel 220 (see arrow F200 and the three positions shown in FIGS. 27-29) without having to use excessive loads (such as tie-rods or screws) since the influence of the magnetic field is canceled through its complete circulation inside the ferromagnetic material.

The central component 270 may be mounted so as to
translate (arrow F200) with respect to the components 210, 220; and/or
rotate with respect to them, as indicated by arrow F201 (see also FIG. 29). The rotation preferably takes place about an axis Q perpendicular to the axis X3; even more preferably the axis Q passes approximately through the center of the component 270 or the core 264 or passes about through the midpoint, measured in the direction X3, of the row of magnets 262.

To the first movement there corresponds the magnets 262 coming out a greater or lesser extent from inside the channel of the component 200, which coincides with a greater or lesser interference with the comb 250 of ferromagnetic material, thereby generating, consequently, a greater or lesser constant returning force of the comb 250 along the axis X3 (FIGS. 27-29).

At the second movement there corresponds the generation of a variable increasing or decreasing force along X3, in dependence of the direction of rotation F201.

To move the central component 270, e.g. screw or oil jacks may be used. The adjustment of the progression can be managed with an external differential system that will allow varying the angular relativity of the two flexible cables for transmitting the motion to the screws.

Variations

The invention is open to many variations, of which below we provide the main ones. In general and also for all the variants described:

- the position of the magnetic parts can be exchanged with the ferromagnetic ones;
- the ferromagnetic parts may be replaced with magnetic parts, so as to have a fixed magnetic field source (e.g. fixed to the frame) and a movable one relative to the first (source);
- to further exploit the magnetic field of the magnets, one can apply a coil on a movable part (e.g. the comb 250) to generate a current during the relative motion. This enables e.g. recharging or the power-supply for the monitoring equipment of the exercise machine;
- the generation axis of the resistance force may be on a horizontal or vertical plane to allow different uses of the machine;
- the device or the machine may comprise means for detecting the adjustment load (i.e. the static magnetic force that develops between the movable part and the fixed one in the device), e.g. a load cell (or a generic pressure sensor);
- by reversing the polarities N, S and/or replacing the described parts made of ferromagnetic material with a magnet with polarities opposite to the other, one can generate a repulsive force;
- given that advantageously said first and second structure of the machine optionally may be relatively movable by rotation about an axis, it is preferred that this axis is (i) perpendicular to the sliding direction and (ii) intersecting one of the two structures, in particular passing substantially through the center point or center of gravity of the row of magnets comprised in a structure.

The invention claimed is:

1. A machine (MC) for physical exercise comprising: an object (14) displaceable by a user through muscular effort and connected to a device (M1, . . . , M8) for generating a resistance force, wherein the device comprises a magnet (36; 62; 92) and a piece (38; 60; 90) responsive to the magnetic field of the magnet which
    (i) have facing surfaces (U1, U2, U3, U4), each of which extend respectively along an axis, such axes being parallel to each other, and
    (ii) are mounted to slide relatively along one of said parallel axes overlapping progressively and, through mutual magnetic interaction, to develop a mutual attractive or repulsive force (Fm),
    wherein the polar axes of the magnet (36; 62; 92) and/or of the piece (38; 60; 90) are oriented orthogonally to said parallel axes,
    wherein the magnet (36; 62; 92) and the piece (38; 60; 90) are movable between a position in which the surfaces are overlapping or close for maximally interacting magnetically and for developing the force, and a position in which the surfaces are distant and the force is lower, and
    wherein the magnet (36; 62; 92) and the piece (38; 60; 90) are respectively comprised in:
        a first structure (24) comprising elements (26) which are arranged comb-like and comprise magnetic material,
        a second structure (40) comprising elements (42) which are arranged comb-like and comprise material responsive to the magnetic field of said magnetic material, wherein
        the elements of one structure delimit between one another channels 49) occupied by elements of the other structure and the two structures are relatively movable along a sliding direction (X),
        the elements (26) comprising magnetic material comprise a polar axis that is substantially orthogonal to the sliding direction and is facing elements comprising material responsive to the magnetic field of the second structure, and
        the two structures are relatively movable along an axis (X) parallel to the development of the channels, or the two structures are relatively movable along a direction (Y) perpendicular to the development of the channels.

2. The machine according to claim 1 wherein the magnet (62) and the piece (60) are relatively slidable by the rotation of at least one of the two about an axis (Z) perpendicular to said parallel axes.

3. The machine according to claim 1, wherein the magnet (36) and the piece (38) are relatively slidable with reciprocating motion through linear translation.

4. The machine according to claim 1, wherein the magnet or the piece (62) comprises a shell (90) or two portions (62) delimiting a cavity inside which the other is movable, preferably through translation.

5. The machine according to claim 1, wherein the facing surfaces (U1, U2) are flat or curved, preferably complementary to each other.

6. The machine according to claim 1, wherein the facing surfaces (U3, U4) are enclosed coaxially one inside the other.

7. The machine according to claim 1, wherein the facing surfaces (U3, U4) are shaped so that along said parallel axes their profile has a curved trend or variable distance from said parallel axes.

8. The machine according to claim 1, comprising a positioning device (40) for varying the distance, measured perpendicularly to said parallel axes, between the magnet (36) and the piece (38); or the distance between said parallel axes.

9. The machine according to claim 1, comprising a housing to which one structure is constrained, while the other structure is mounted on linear guides (22) integral with the housing to slide with respect to the constrained structure along a sliding axis (X) corresponding to the sliding direction.

10. The machine according to claim 9, wherein one structure is secured to the housing by means of members which are extensible in an adjustable manner.

11. The machine according to claim 10, wherein at least two points of one structure are constrained to the housing by means of members (44) which are extensible in an adjustable manner, so as to tilt the constrained structure with respect to the sliding axis.

12. The machine according to claim 1, wherein
the comb of responsive material and/or the comb of elements comprising magnetic material is formed by an array of parallel and spaced apart elements, e.g. plates, in the empty spaces (49) present between the elements of said array being slidable the elements of the other comb, and
the profile (P) of a free edge of at least one element has a variable distance from the sliding axis.

13. The machine (MC2) according to claim 1, comprising:
an array of laminar elements (42) which are made of a first material and which are comb-like arranged,
a second array of laminar elements (42) which are made of the first material and which are comb-like arranged,
a third array of laminar elements (26) made of a second material, wherein the first array comprises elements with free ends facing those of the second array,
the elements of the third array are arranged interdigitated with those of the first and second array,
the elements are all on parallel planes, and
the first material is magnetic material and the second material is responsive to the magnetic field of said magnetic material, or vice versa, and
the third array is movable relative to the first and second array, or vice versa, along a sliding direction (X); and
the magnetic material comprises a polar axis that is substantially orthogonal to the sliding direction and is facing towards elements, made of material responsive to the magnetic field, belonging to an array.

14. The machine (MC2) according to claim 1, wherein
each element of the second structure forms a hollow tubular body which extends along the sliding direction and which internally houses a respective element of the first structure completely encircling it,
the respective element of the first structure is displaceable inside the tubular body along a direction perpendicular to the sliding direction, and
the respective element of the first structure is tiltable inside the hollow tubular structure relative to the sliding direction.

15. The machine (MC2) according to claim 14, wherein the respective element of the first structure comprises a sandwich structure comprising
an inner plate; and
magnets fixed on opposite faces of the plate, the polar axes of the magnets being perpendicular to the plane of the plate.

16. The machine (MC2) according to claim 1, comprising a coil mounted to enclose flux resulting from such polar axes.

17. The machine (MC2) according to claim 16, comprising
a monitoring apparatus for the machine,
a charging or supply circuit for the apparatus,
the circuit being electrically connected to the coil for obtaining electrical power therefrom.

18. The machine according to claim 1, comprising a means or sensor for detecting the mutual, attractive or repulsive force that is developed with the machine in idle state.

19. The machine according to claim 1, wherein the first and second structure are relatively movable by rotation about an axis which is (i) orthogonal to the sliding direction and (ii) intersecting one of the two structures.

* * * * *